(12) United States Patent
Garg et al.

(10) Patent No.: US 9,305,113 B2
(45) Date of Patent: *Apr. 5, 2016

(54) CONTEXTUAL QUERY REVISION

(71) Applicant: Google Inc., Mountain View, CA (US)

(72) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,093

(22) Filed: Mar. 9, 2015

(65) Prior Publication Data

US 2015/0178408 A1    Jun. 25, 2015

Related U.S. Application Data

(63) Continuation of application No. 14/097,887, filed on Dec. 5, 2013, now Pat. No. 8,996,554, which is a continuation of application No. 13/109,308, filed on May 17, 2011, now Pat. No. 8,626,785, which is a continuation of application No. 11/952,770, filed on Dec. 7, 2007, now Pat. No. 7,953,746.

(51) Int. Cl.
  *G06F 17/30* (2006.01)

(52) U.S. Cl.
  CPC .... *G06F 17/30967* (2013.01); *G06F 17/30401* (2013.01); *G06F 17/30864* (2013.01)

(58) Field of Classification Search
  USPC .................. 707/765, 768, 776, 728, 737, 749
  See application file for complete search history.

(56) References Cited

U.S. PATENT DOCUMENTS

| | | | |
|---|---|---|---|
| 6,006,225 A | 12/1999 | Bowman | |
| 6,098,042 A | 8/2000 | Huynh | |
| 6,154,213 A | 11/2000 | Rennison | |
| 6,701,309 B1 * | 3/2004 | Beeferman | ....... G06F 17/30646 |
| 7,254,774 B2 | 8/2007 | Cucerzan | |
| 7,565,345 B2 | 7/2009 | Bailey | |
| 7,610,282 B1 | 10/2009 | Datar | |
| 7,636,714 B1 | 12/2009 | Lamping | |
| 7,657,521 B2 | 2/2010 | Masarie | |
| 7,676,462 B2 | 3/2010 | Kirkland | |
| 7,685,191 B1 | 3/2010 | Zwicky | |
| 7,747,632 B2 * | 6/2010 | Korn | ....................... G06Q 30/02 |
| | | | 707/751 |
| 7,756,855 B2 | 7/2010 | Ismalon | |
| 7,953,746 B1 * | 5/2011 | Garg | ................. G06F 17/30864 |
| | | | 707/762 |
| 8,626,785 B2 * | 1/2014 | Garg | ................. G06F 17/30864 |
| | | | 707/762 |
| 2005/0027691 A1 | 2/2005 | Brin | |
| 2005/0033777 A1 * | 2/2005 | Moraes | ............. G06F 17/30575 |
| 2005/0210383 A1 | 9/2005 | Cucerzan | |
| 2005/0289140 A1 | 12/2005 | Ford | |
| 2006/0224938 A1 | 10/2006 | Fikes | |
| 2006/0253427 A1 | 11/2006 | Wu | |
| 2007/0016578 A1 | 1/2007 | Melman | |
| 2007/0016616 A1 * | 1/2007 | Brill | ....................... G06F 17/273 |

(Continued)

*Primary Examiner* — Hung T Vy
(74) *Attorney, Agent, or Firm* — Fish & Richardson P.C.

(57) ABSTRACT

Apparatus, systems and methods for contextual query revision are disclosed. A current search query is received during a search session. The current search query includes one or more current search tokens. Potentially inaccurate search tokens are identified from the one or more current search tokens. A possible replacement token is identified based upon the potentially inaccurate search token. A group of related tokens is identified from query logs, and a modified search query is generated if the replacement token is not included in the related tokens.

16 Claims, 6 Drawing Sheets

(56) References Cited

U.S. PATENT DOCUMENTS

2007/0038615 A1* 2/2007 Vadon .................. G06F 17/273

2007/0214131 A1 9/2007 Cucerzan
2008/0114721 A1 5/2008 Jones
2008/0114751 A1 5/2008 Cramer

* cited by examiner

CONTEXTUAL QUERY REVISION

CROSS-REFERENCE TO RELATED APPLICATION

This application is a continuation of U.S. application Ser. No. 14/097,887, titled "CONTEXTUAL QUERY REVISION" filed Dec. 5, 2013, which is a continuation of U.S. application Ser. No. 13/109,308, titled "CONTEXTUAL QUERY REVISION" filed May 17, 2011, now U.S. Pat. No. 8,626,785, which is a continuation of U.S. application Ser. No. 11/952,770, titled "CONTEXTUAL QUERY REVISION" filed May 7, 2007, now U.S. Pat. No. 7,953,746. The entire contents of each of the foregoing applications are incorporated herein by reference

BACKGROUND

This document relates to contextual query revision.

The rise of the Internet has enabled access to a wide variety of content items, e.g., video and/or audio files, web pages for particular subjects, news articles, etc. Content items of particular interest to a user can be identified by a search engine in response to a user query. One example search engine is the Google search engine provided by Google Inc. of Mountain View, Calif., U.S.A. The query can include one or more search terms or phrases, and the search engine can identify and, optionally, rank the content items based on the search terms or phrases in the query and present the content items to the user (e.g., in order according to the rank).

Search queries sometimes contain inaccurate or incorrectly typed terms that cause results to be returned that are not of interest to the user. Accordingly, users may have to modify their queries one or more times to replace inaccurate search terms until the search engine returns the results that are of interest to the user. Some search engines, however, can automatically correct or suggest corrections to inaccurate or incorrectly typed terms; however, these suggestions may not enhance the user experience, as the suggestions may include further inaccurate terms that are not pertinent to the user's current interests.

SUMMARY

In general, one aspect of the subject matter disclosed in this specification can be embodied in a method for contextual query revision. The method includes receiving a current search query during a search session, the current search query comprising one or more current search tokens; identifying a potentially inaccurate search token from the one or more current search tokens; identifying a possible replacement token based upon the potentially inaccurate search token; identifying related tokens from a query log based upon previous search queries associated with the search session; determining whether the possible replacement token for the potentially inaccurate search token is included in the group of related tokens; and in response to determining that the possible replacement token is among the group of related tokens, generating a modified search query that includes the possible replacement token. Other embodiments of this aspect include corresponding systems, apparatus, and computer program products.

In another aspect, another method for contextual query revision includes receiving a current search query associated with a search session; identifying a potentially inaccurate search token in the current search query; identifying related tokens from a query log based upon previous search queries associated with the search session; comparing the potentially inaccurate search token to the related tokens to determine whether the potentially inaccurate search token is included in the related tokens; if the potentially inaccurate search token is not included in the related tokens, identifying a replacement token from the related tokens; and substituting the potentially inaccurate search token in the current search query with the replacement token. Other embodiments of this aspect include corresponding systems, apparatus, and computer program products.

Various optional advantages and features can include the identification of potentially incorrect search tokens based on a search session context. A replacement token can be substituted for the potentially inaccurate search token based on the search session context. Such contextual identification of potentially inaccurate search tokens and contextual revision of the search query can generate modified search queries that are directed to the user's current interest, thus improving the user experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
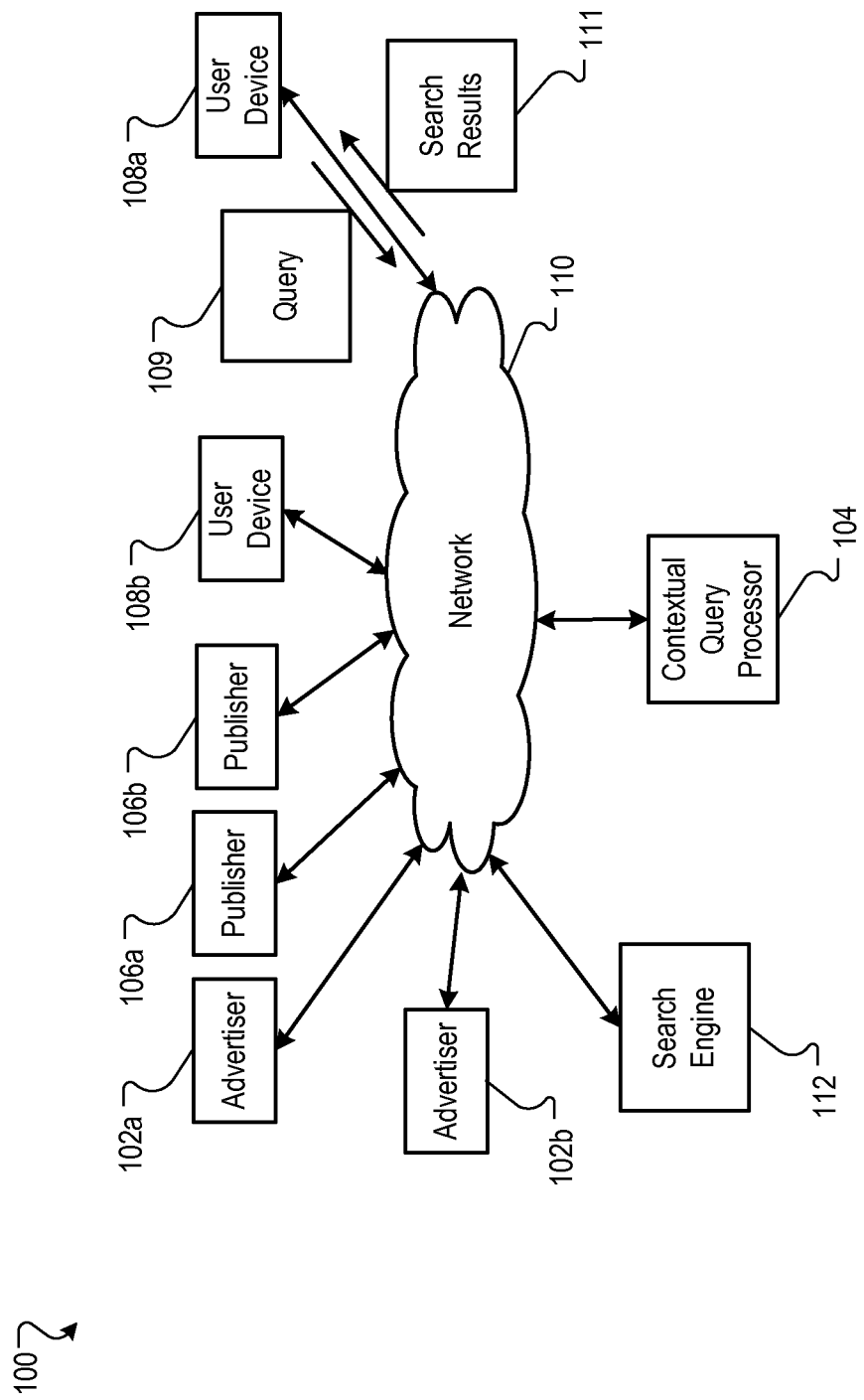
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102*a* and 102*b*, a search engine 112, publishers 106*a* and 106*b*, and user devices 108*a* and 108*b*. Example user devices 108 include personal computers, mobile communication devices, television set-top boxes, etc. Although only two advertisers (102*a* and 102*b*), two publishers (106*a* and 106*b*) and two user devices (108*a* and 108*b*) are shown, the online environment 100 may include many thousands of advertisers, publishers and user devices.

§1.0 Content Search Processing

The publishers 106*a* and 106*b* can include general content servers that receive requests for content (e.g., web pages or documents related to articles, discussion threads, music, video, graphics, other web page listings, information feeds, product reviews, etc.), and retrieve the requested content in response to the request. For example, content servers related to news content providers, retailers, independent blogs, social network sites, products for sale, or any other entity that provides content over the network 110 can be a publisher.

A user device, such as user device 108a, can submit a query 109 to the search engine 112, and search results 111 can be provided to the user device 108a in response to the query 109. The search results 111 can include a link to web pages provided by the publishers 106a and 106b.

In some implementations, the query 109 can include one or more search tokens. A search token is a keyword or group of keywords submitted as part of a search query through a search engine that are used to retrieve responsive search results. For example, a user can search for a particular type of yellow flower with a long stem. The query submitted can be a search query for "yellow gardenia." The search tokens for the search query are "yellow" and "gardenia." Although the search tokens are illustrated as single words, a search token could include two or more words, depending on the query.

To facilitate identification of the search results responsive to queries, the search engine 112 can index the content provided by the publishers 106 (e.g., an index of web pages) for later search and retrieval of search results that are relevant to the queries. An exemplary search engine 112 is described in S. Brin and L. Page, "The Anatomy of a Large-Scale Hypertextual Search Engine," Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number (e.g., ten) of search results.

Multiple search queries can be submitted to the search engine 112 in one search session. In some implementations, a search session can be defined by a period of time between queries. For example, if a particular user device 108a submits a query, a current search session can be initiated. The current search session can be terminated when the search engine 112 has not received further queries from the user for a preset period of time (e.g., 5-10 minutes). In other implementations, the search session can be defined by a user indicating the beginning and end of a search session (e.g., by logging into a search engine interface of the search engine 112 and logging out of a search engine interface). In still further implementations, the search session can be defined by a relationship between a newly received search query and previously received search queries from the same user. Other ways of identifying and tracking a search session can also be used.

Users generally desire that the search queries result in the identification of search results that are most responsive to a user's interest. Often, an initial search query does not produce a search result that satisfies a user's interest, as indicated by the user submitting more queries targeting the same topic or subject. The initial query may contain inaccurate search tokens that may include misspelled words or misused words. Thus the initial query can be followed by subsequent queries during a search session that includes modified search tokens in the query, substituted search tokens, removed search tokens in the query, etc. These modified queries are submitted by the user as the user attempts to find search results that are more relevant to the user's interest.

A search token input by the user can be inaccurate given the context of the search session. For example, where previous search queries during a search session include search tokens related to flowers and gardening, the search token "flour," while spelled correctly, can nevertheless be inaccurate. A search token can also be inaccurate if the search token is misspelled, e.g., the term "fluer" may be entered instead of the term "fleur."

§2.0 Contextual Query Revision

In some implementations, the search engine 112 can include a contextual query processor 104 that can identify potentially inaccurate queries and suggest contextual modifications to the inaccurate queries. The contextual query processor 104 can identify a context of a search session from previous queries submitted by a user during the search session. The contextual query processor 104 can identify inaccurate search tokens in a current search query, and, based on the context of the search session in which the current search query is received, identify possible replacement tokens for the inaccurate search tokens. The processor 104 can determine which of the possible replacement tokens is the appropriate replacement token for the inaccurate search token based on the previous search queries submitted in the search session.

Figure 2:
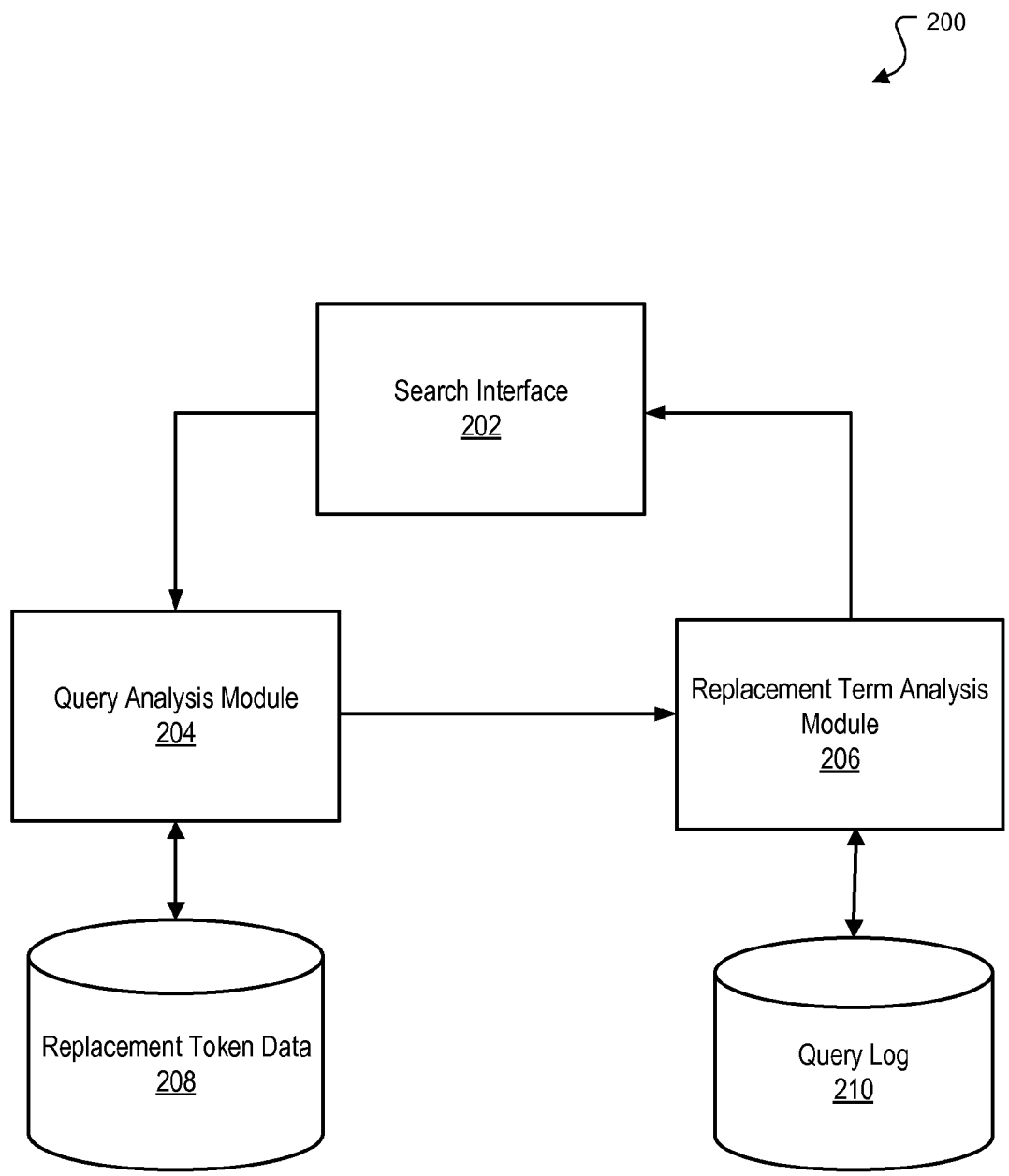
FIG. 2 is a block diagram of an example contextual query processing system.

FIG. 2 is a block diagram of an example contextual query processing system 200. The system 200 can generate a modified query from a search query with an inaccurate search token. The modified search query is based on the context of the search session of the search query. The context of the search session can, for example, be identified from previous search queries submitted by a user during a search session. In some implementations, a current search query in addition to previous search queries received during a search session can also be used to identify a search session context. In some implementations, the contextual query processing system 200 can include a search interface 202, a query analysis module 204, and a replacement term analysis module 206. The system 200 may be implemented as part of a search engine, or as a separate component, or as a system that communicates with a search engine.

The system 200 receives a current search query during a search session and identifies potentially inaccurate search tokens from among the search tokens that comprise the current search query. The system 200 can then identify replacement tokens based upon the potentially inaccurate search tokens. The system 200 identifies from query logs a group of related tokens that are related to previous search queries in the search session by identifying terms related to the previous search tokens in the previous queries. If an identified replacement token is among the related tokens, a modified search query can be generated.

In an implementation, the search interface 202 receives a current search query associated with a current search session. The current search query can include one or more current search tokens. For example, a user can submit queries searching for a particular type of yellow flower with a long stem. The first query submitted can be a search query for "yellow gardenia," followed by a second search query for "long stemmed fluer." Thus, the search tokens for the most current search query are "long," "stemmed," and "fluer." The previous search tokens for the previous search query are "yellow" and "gardenia."

For the current search query, potentially inaccurate search tokens are identified. In some implementations, a potentially inaccurate search token is identified by identifying misspelled tokens. Additionally, in some implementations, a potentially inaccurate search token is identified by identifying potentially misused tokens. Replacement tokens can be identified for the potentially inaccurate tokens, and one of the replacement tokens can be selected based on a context defined by the search session for which the current query was received.

§2.1 Misspelled Tokens and Session Context Correction

One method of identifying potentially inaccurate search tokens for a current query is to determine when a search token is misspelled. For example, in the current query for "long stemmed fluer," the current search token "fluer" is a misspelled search token. Thus, the module 204 identifies the current search token "fluer" as a potentially inaccurate search token.

The query analysis module 204 identifies replacement tokens based upon the potentially inaccurate search token. Although multiple methods may be available to identify a replacement token for a search token, in one implementation the module 204 accesses a set of possible replacement tokens directly from replacement token data 208. The replacement tokens can be suggested replacements, e.g., spell corrections, for the inaccurate search token. For example, the tokens "flier," "flower," "flour," and "fleur" may be identified as suggested replacements in the replacement token data 208 for the potentially inaccurate search token "fluer."

The replacement term analysis module 206 selects a replacement term for the potentially inaccurate search token. The selection can, for example, be based on context defined by the search session for which the current query was received. In some implementations, to determine the context for a search session, the module 206 identifies previous queries received during a search session and identifies previous search tokens from the previous queries. These previous search tokens can be used to identify related tokens that are related to the previous search queries submitted during the search session. For example, the previous search tokens for the search session can compared to a query log 210. The query log 210 stores historical search queries from many other historical search sessions. The replacement term analysis module 206 can thus identify other search tokens used in similar search queries during similar search sessions as tokens that are related to the previous search tokens.

For example, where the previous search tokens for a search session are "yellow" and "gardenia," the module 206 may identify a group of related tokens for both previous search tokens from the query log 210. Data in the query logs 210 that is gathered from many other sessions may indicate that tokens commonly associated with "yellow" include "taxi," "banana," and "sun." Similarly, tokens commonly associated with "gardenia" may include "plant," "leaves," and "flower." Thus, the tokens "taxi," "banana," and "sun" are identified as related tokens for the previous search token "yellow." Likewise, the tokens "plant," "leaves," and "flower" are identified as related tokens for the previous search query "gardenia." The module 206 accesses such data and generates groups of related tokens from the query logs 210.

Once the suggested replacement tokens from the replacement token data 208 and the related tokens are identified, the replacement term analysis module 206 can then determine which replacement tokens for the potentially incorrect search token is present in the group of related tokens, and which replacement tokens among those present is estimated to be the best replacement token. The module 206 compares the replacement tokens for the potentially inaccurate search token to the group of related tokens identified by the module 206. If the group of related tokens includes any of the replacement tokens, the module 206 can generate a modified search query to include the replacement token in place of the potentially inaccurate search token.

For example, the module 204 has identified "fluer" as a misspelled word, and thus it is the only potentially inaccurate search token from the current search query "long stemmed fluer." The module 204 also identified the words "flier," "flower," "flour," and "fleur" as possible replacement tokens, e.g., spelling corrections, for the potentially inaccurate token. The group of related tokens identified by the module 206 includes the terms "taxi," "banana," "sun," "plant," "leaves," and "flower." The module 206 may thus determine that the replacement token "flower" is among the group of related tokens. Accordingly, the module 206 generates a modified query for "long stemmed flower" that takes the place of the current search query for "long stemmed fluer."

If the group of related tokens identified by the module 206 includes more than one possible replacement token, e.g., the terms "taxi," "banana," "sun," "plant," "leaves," "flair," and "flower," then the selection can, for example, be based on additional context information defined by the search session. For example, the tokens of the current query of "long stemmed fluer" and previous queries of "yellow gardenia" and "long stemmed bulbs" can be processed to determine a subject weight. For example, each token can have associated weights for various subjects, e.g., subjects such as history, gardening, sports, news, entertainment, etc. The weights of the search tokens can be summed for each subject, and the highest summed weight can indicate a subject context for the search session. As subject weights of the tokens "gardenia," "stemmed," and "bulbs" may primarily indicate a gardening subject matter, the context of the search session may be determined to be a gardening context. Accordingly, the token "flower" may be selected to replace the token "fluer" as the token "flower" may have the highest subject gardening subject weight among the replacement tokens.

§2.2 Misused Tokens and Session Context Correction

In another implementation, the module 204 can identify a potentially inaccurate search token by comparing the current search tokens from the current search query to the previous search tokens from one or more previous search queries received during the search session. Through such a comparison, the module 204 may determine that the sequence of search queries in the search session is an attempt to refine the previous search query by substituting or adding one or more tokens in the search query. Accordingly, the substituted or added search token can be identified as the potentially inaccurate search token.

For example, if the first search query includes the search tokens "long stemmed bulbs," a second query includes the search tokens "long stemmed roses" and a current search query includes the search tokens "long stemmed flour," the sequence of the search queries indicates that the term "bulbs" was replaced by "flour" in the current search query. Thus the module 204 may determine that the search token "flour" is a potentially inaccurate search token, even though "flour" is not a misspelled word.

In a variation of this implementation, the tokens of the current query of "long stemmed flour" and previous queries of "long stemmed bulbs" and "long stemmed roses" can be processed to determine a subject weight. For example, each token can have associated weights for various subjects, e.g., subjects such as history, gardening, sports, news, entertainment, etc. The weights of the search tokens can be summed for each subject, and the highest summed weight can indicate a subject context for the search session. For example, the summed weights for the tokens "stemmed," "bulbs" and "roses" may result in the highest weight being in the gardening subject. Accordingly, the token "flour," which is the changed token from a previous query, can be determined to be potentially incorrect as the token has very low weight related to the subject of gardening. Conversely, if the current query is "long stemmed tulips," the token "tulips" may be determined to be a correct token.

The module 206 can then identify a group of related tokens based on the context of the search session, e.g., other tokens that are related to previous search tokens received during the search session. For example, the previous search tokens for the search session can compared to a query log 210. The module 206 can then identify a group of related tokens based on the previous search tokens. Thus, if the previous search token "bulb" was replaced by the potentially inaccurate token "flour," the module 206 can identify a group of terms related to the previous search token "bulb." The related tokens could include terms commonly associated with "bulb," e.g., "rose," "flower."

The module 204 can then identify the replacement token for the potentially inaccurate search token from the related tokens identified by the module 206. In some implementations, the module 206 can use a distance vector to identify the related token that is most similar to the potentially inaccurate term. For example, the module 204 can use a distance vector to determine that from a list of related tokens that includes "rose" and "flower," the potentially inaccurate token "flour" is most similar to the related token "flower." Other similarity techniques can also be used.

The module 206 can generate a modified search query to include the replacement token in place of the potentially inaccurate search token. For example, if "flower" is identified as the related token most similar to the potentially inaccurate search token "flour," then the search token "flour" is replaced in the current search query "long stemmed flour" with the search token "flower." Thus, the modified search query is "long stemmed flower."

In another implementation, possible replacement tokens can be identified by identifying token pairs that are commonly confused tokens, e.g., "principal" and "principle," "fair" and "fare," "fair" and "flair," etc. Such identification of commonly confused token pairs can be determined, for example, using clustering techniques to identify token revisions that occur at statistically significant rates, e.g., statistically confused tokens, or based on language models, such as homograph pairs, or other language rules of statistical data. A replacement token can then be selected from the possible replacement tokens in a manner similar to the misspelled token analysis process of Section 2.1 above, e.g., by comparing the possible replacement tokens to the related tokens.

The modules 204 and 206 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The modules 204 and 206 can be implemented separately, or can be implemented as a single software entity. The modules 204 and 206 can also be distributively implemented over a network, such as a server farm, or can be implemented in a single computer device, or can be implemented as part of the search engine 112.

§3.0 Example Identification of Related Tokens

Figure 3:
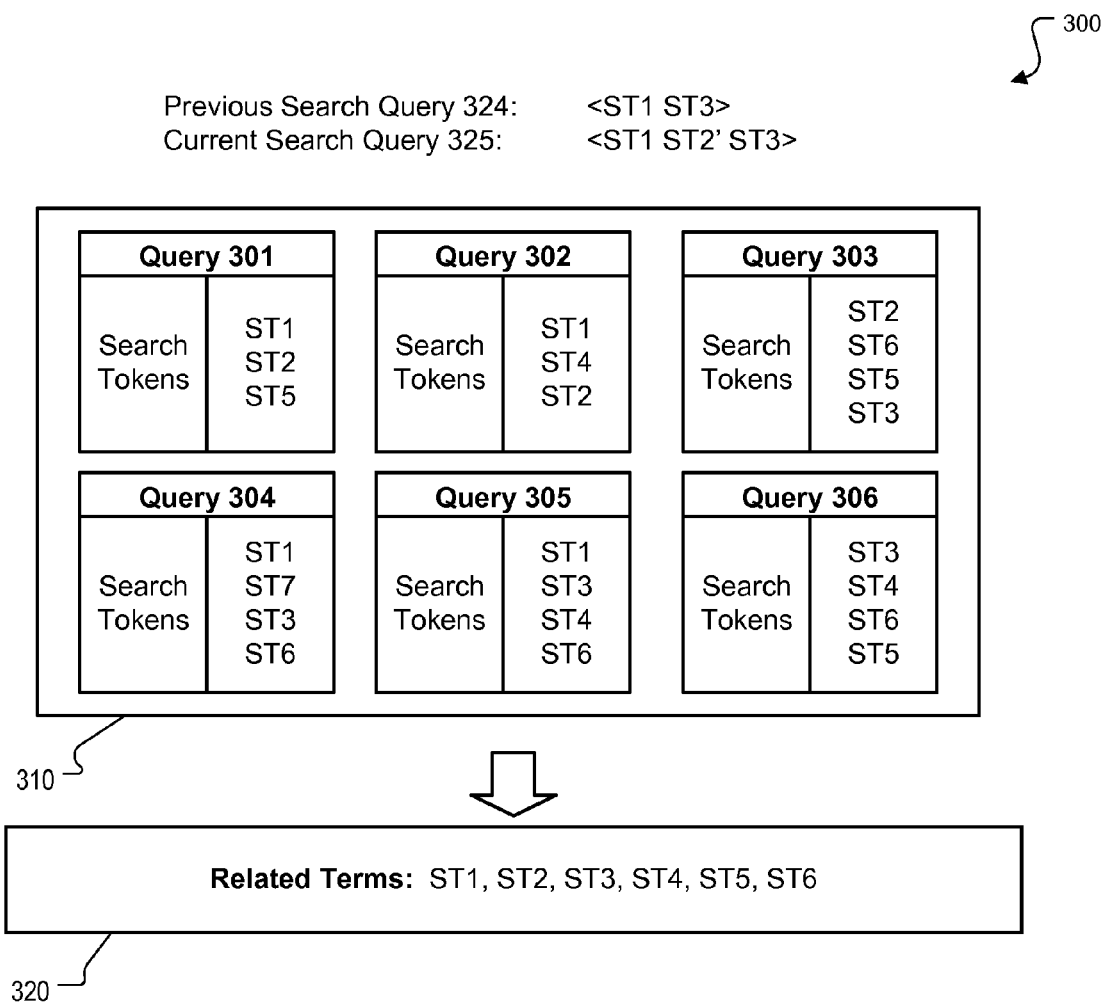
FIG. 3 is a diagram identifying related tokens from previous search queries.

FIG. 3 is a diagram identifying related tokens from previous search queries 300. The related tokens 320 identified in the diagram 300 can be retrieved from the query logs 210. The related tokens 320 include search terms that are related to a previous query 324 in the context of a search session that includes the previous search query 324 and a current search query 325. As will be explained below, the search tokens ST1-ST6 are identified as related tokens 320 related to the previous search query 324.

In some implementations, the related tokens are the search tokens in a token cluster that includes the search tokens from the previous search query 324. A token cluster can be a group of related tokens that are associated with each other. The search tokens included in a token cluster are identified from query logs as tokens that share a common trait—e.g., are statistically related to each other, such as the token "stemmed" often being found to precede the term "roses" in queries; or the term "green" often being found to precede the term "giant." Such clusters can be identified by, for example, k-means clustering techniques, c-means clustering, quality threshold clustering, etc. Although example clusters of only two terms have been described, the token clusters can include many more tokens than just two tokens.

In another implementation, search tokens are included in a token cluster if the search token is included in excess of a threshold percentage of search queries containing other search tokens in the token cluster. For example, a 50% threshold requires that the search token must be included in at least half the search queries including at least one of the other search tokens in the cluster. The threshold can be set to some value that indicates a likelihood that the search tokens are related to each other.

For example, the data from the historical search queries 310 stored in the query log 210 is represented in the diagram 300, and includes six historical search queries, e.g. Query 301-Query 306, and the search tokens that are used in each query, e.g. ST1-ST7. The search token ST1 is among the search tokens in four of the six of the historical search queries, e.g. Query 301, 302, 304, and 305. Similarly, the inclusion of the search tokens ST2-ST7 in the historical search queries is:

| Search Token | Historical Search Queries | % Inclusion |
| --- | --- | --- |
| ST1: | 301, 302, 304, 305 | 4/6 = 67% |
| ST2: | 301, 302, 303 | 3/6 = 50% |
| ST3: | 303, 304, 305, 306 | 4/6 = 67% |
| ST4: | 302, 305, 306 | 3/6 = 50% |
| ST5: | 301, 303, 306 | 3/6 = 50% |
| ST6: | 303, 304, 305, 306 | 4/6 = 67% |
| ST7: | 304 | 1/6 = 16% |

The search token ST7 is included in less than the threshold percentage, e.g. 50%, of search queries involving other search tokens from the cluster. However, the tokens ST1-ST6 are included in the token cluster because they all are included in at least 50% of the search queries involving other search tokens in the token cluster. Thus, the group of related tokens 320 includes all of the search tokens in the token cluster, e.g. search tokens ST1-ST6.

Other token clustering or grouping processes can also be used to identify related search query tokens.

Figure 4:
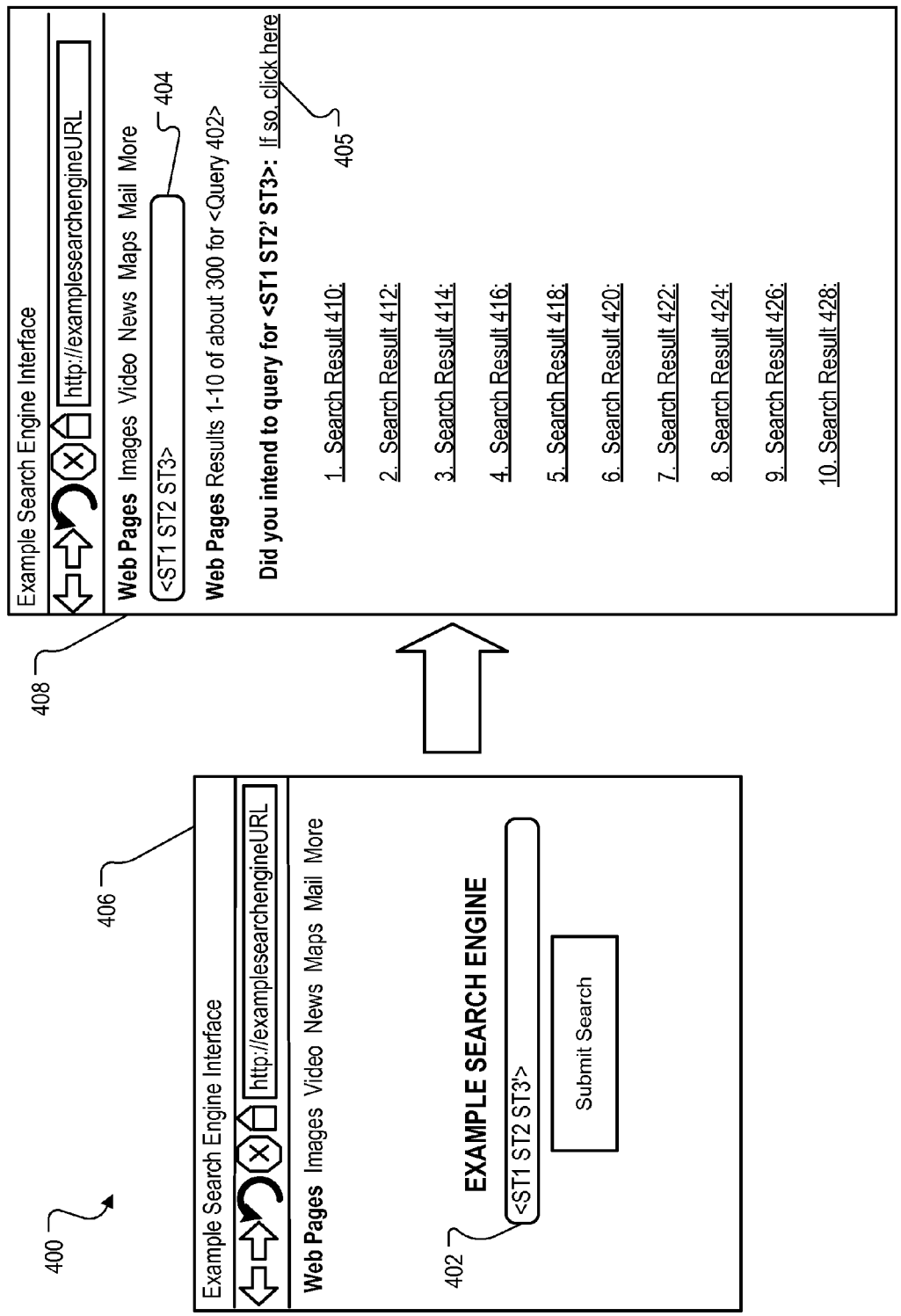
FIG. 4 depicts example screen shots of a search engine interface.

FIG. 4 depicts example screen shots 406 and 408 of a search engine interface. The original query 402 submitted to the search engine in the interface of screen shot 406 can be modified by the system 200 of FIG. 2. The search engine can process the modified query 404 in place of the original query 402, and search results responsive to the modified query 404 are presented. In some implementations, a link 405 may be provided to search results responsive to the original query before it was modified. For example, the original query submitted may have been for "long stemmed flour." After it is determined that the search token "flour" is inaccurate, replacement search tokens may be identified. The term "flower" is identified as a related token as well as a replacement search token, and thus the search token "flour" in the original query is replaced with "flower" in the modified search query. The screen shot 408 of the interface also includes the link 405, which would process the original query for "long stemmed flour" rather than the modified query for "long stemmed flower."

§4.0 Example Contextual Revision Processes

Figure 5:
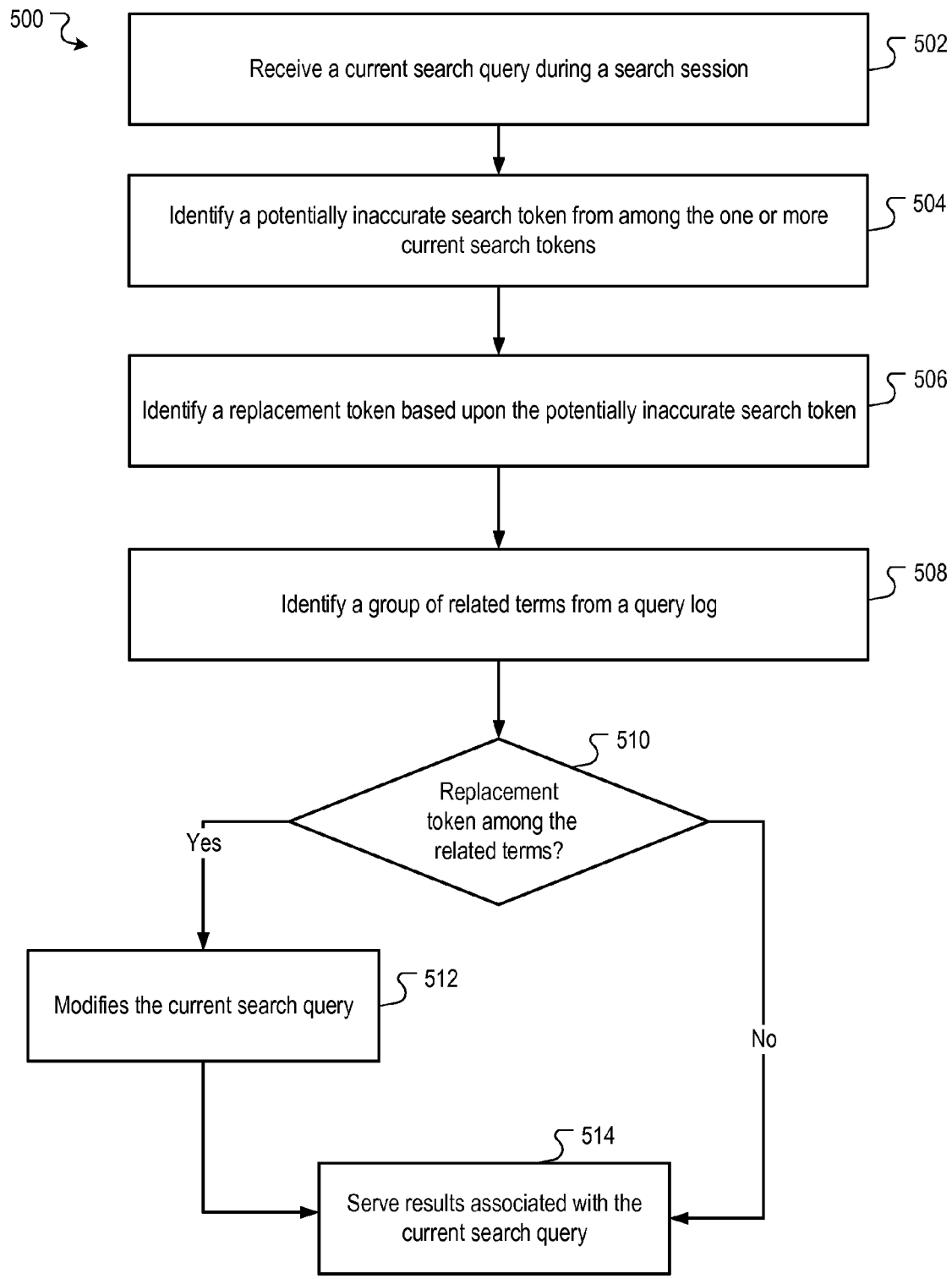
FIG. 5 is a flow diagram of a contextual query revision process.

FIG. 5 is a flow diagram of a contextual query revision process 500. The process 500 can, for example, be implemented by the system 200 of FIG. 2.

Stage 502 receives a current search query during a search session. For example, the search interface 202 may receive a query including the search tokens "long stemmed flour," and this query can be provided to the query analysis module 204. Another example is a search query for "long stemmed fluer."

Stage 504 identifies a potentially inaccurate search token from among the one or more current search tokens. For example, the query analysis module 204 can identify "fluer" as the potentially inaccurate search token because the term is misspelled. In another example, the module 204 can identify "flour" as the potentially inaccurate search token because from the search query for "long stemmed flour" because the previous search queries included search tokens related to flowers and gardening, e.g. "long stemmed bulb," "long stemmed rose," where the search tokens "long" and "stemmed" remained the same and the last search token was substituted each time.

Stage 506 identifies a replacement token based upon the potentially inaccurate search token. For example, the module 204 can identify different possible replacement tokens from the replacement token data 208 for the potentially inaccurate search token of "fluer," including the replacement tokens "flour," "flower," "flier," and "flurry." The module 204 can also identify the replacement tokens "flower," "four," and "fore" as possible replacement tokens from the data 208 for the potentially inaccurate search token "flour."

Stage 508 identifies a group of related tokens from a query log. For example, the replacement term analysis module 206 can identify a group of related tokens from the query log 210 that are related to previous search queries during the same search session. If "petal" was a search token in a previous search query, the module 206 can identify from the query log 210 terms that are related to the token "petal." The related tokens could include "bulb," "rose," "flower," etc. If "long stemmed bulb" or "long stemmed rose" was the previous search query, the module 206 can identify from the log 210 terms related to the previous search tokens in the previous search queries. The search token "flower" can be identified as a term related to both the search token "bulb" and the search token "rose."

Stage 510 determines whether the replacement token for the potentially inaccurate search tokens is among the group of related tokens. For example, the module 206 determines that one of the replacement tokens, "flower," is included in the group of related tokens related to the search query "long stemmed fluer." Similarly, the module 206 determines that the replacement token "flower" is included among the group of related token related to the search query "long stemmed flour." If stage 510 determines that the replacement token is among the group of related tokens, stage 512 modifies the current search query. For example, where stage 510 determines that the replacement token "flower" is also among the related tokens, the potentially inaccurate search token "fluer" is replaced with the replacement token "flower." Thus, the current search query is modified to "long stemmed flower" instead of "long stemmed fluer." Similarly, where stage 510 determines that the replacement token "flower" is among the related tokens related to the search query "long stemmed flour," the potentially inaccurate search token "flour" is replaced with the replacement token "flower." Thus, the current search query is modified to "long stemmed flower" instead of "long stemmed flour."

If the replacement token is not among the group of related tokens, or after the current search query has been modified, stage 514 serves results associated with the current search query. For example, if stage 510 determines that "flower" is among the group of related tokens, then search results responsive to a query for "long stemmed flower" are served. However, if stage 506 determines that "flower" is not a replacement token, or if stage 508 determines that "flower" was not a related token, then stage 510 would subsequently determine that a replacement token is not among the group of related tokens. Thus, search results responsive to a query for "long stemmed flour" would be served.

Figure 6:
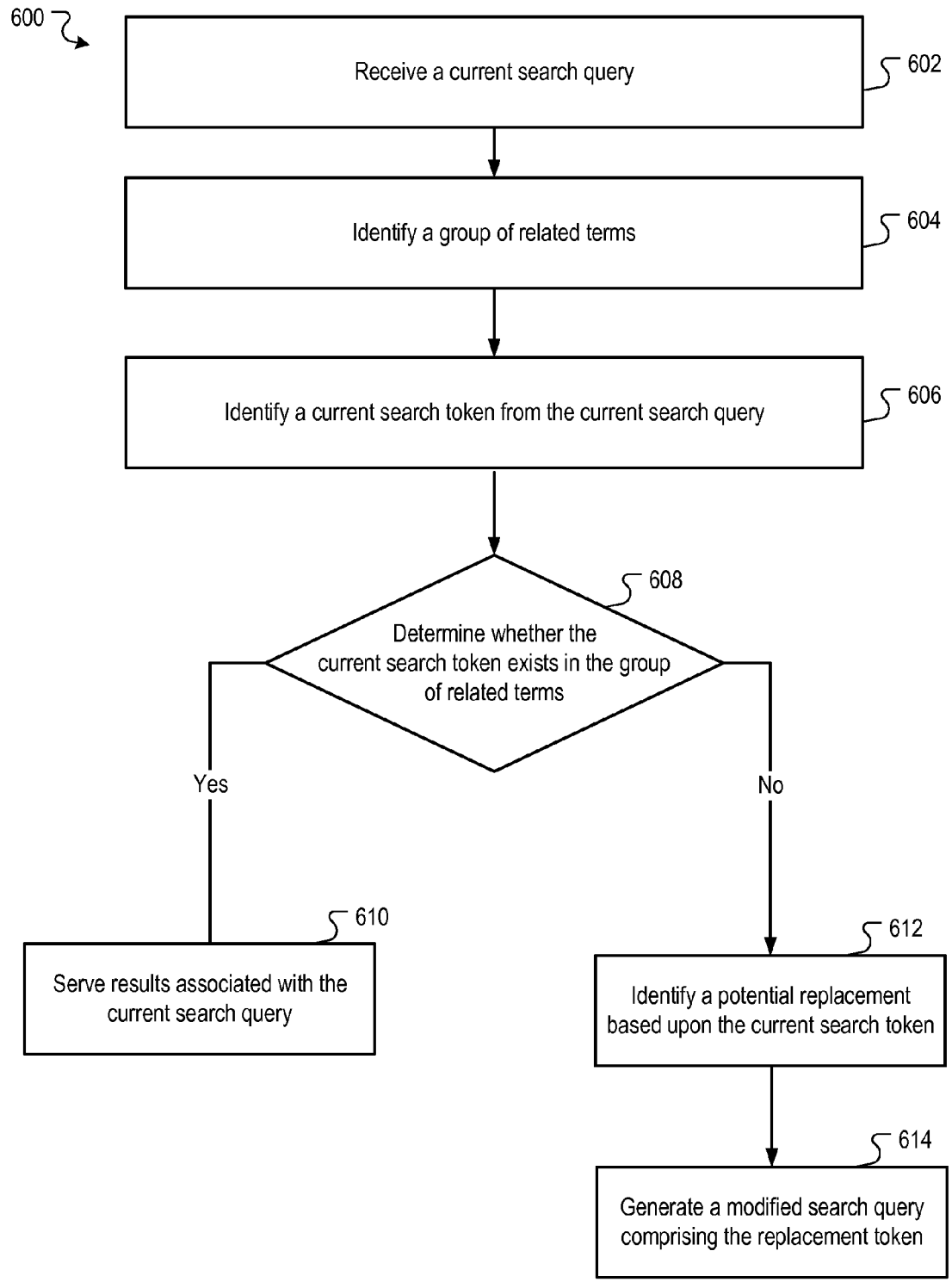
FIG. 6 is a flow diagram of another contextual query revision process.

FIG. 6 is a flow diagram of a contextual query revision process 600. The process 600 can, for example, be implemented by the system 200 of FIG. 2.

Stage 602 receives a current search query. For example, the search interface 202 may receive a query including the search tokens "long stemmed flour," and this query can be provided to the query analysis module 204.

Stage 604 identifies a group of related tokens. The identified group of related tokens can be search tokens related to previous search queries during the search session. For example, if "long stem rose" was the previous search query during the search session, the previous search tokens are "long," "stem," and "rose." The module 206 can identify from the query log 210 the search tokens that are related to the previous search tokens in historical search queries, i.e., the different search tokens submitted with the previous search tokens "long," "stem" and "rose." The related tokens could include terms commonly associated with "long", e.g., "wide," "heavy," terms commonly associated with "stem," e.g. "root," "leaves," and terms commonly associated with "rose," e.g. "yellow," "flower."

Stage 606 identifies a current search token from the current search query. For example, the query analysis module 204 can parse the current search query "long stemmed flour" and identify the search tokens "long," "stemmed," and "flour."

Stage 608 determines whether the current search token exists in the group of related tokens. For example, where the current search token is "flour," the current search token does not exist in the group of related tokens. Thus, where the current search token is "flour," the replacement term analysis module 206 would determine that the current search token is not found in the related tokens.

If stage 608 determines that the current search token exists in the group of related tokens, stage 610 serves results associated with the current search query. For example, if stage 608 determines that the token "flour" existed in the related tokens, then stage 610 serves results responsive to the search query "long stemmed flour." If the current search token does not exist in the group of related tokens, stage 612 identifies a potential replacement token based upon the current search token. The replacement token is a member of the group of related tokens. For example, if stage 608 determines that "flour" does not exist in the related tokens, module 204 identifies from the replacement token data 208 potential replacement tokens based upon the current search token of "flour." The tokens "flower," "flier," and "four" may be included in the replacement token data 208 as potential replacement tokens based for "flour." Because "flower" is both a potential replacement token and a member of the related tokens, "flower" is identified by the module 206 as the replacement token.

Stage 614 generates a modified search query comprising the replacement token. For example, module 206 generates the modified query "long stemmed flower" where "flower" is identified as the replacement token for "flour."

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
    receiving, by one or more computers, a current search query during a current search session;
    determining, by one or more computers and based on a difference between terms of the current search query and terms of a previous search query received during the current search session, that the current search query is an attempt to refine the previous search query;
    identifying, by one or more computers and based on the determination that the current search query is an attempt to refine the previous search query, a set of related terms based on a given term that is included in the previous search query, but not included in the current search query;
    determining, by one or more computers and based on search log data for previous search sessions, that the given term was replaced with a different term from the set of related terms in at least a specified portion of the previous search sessions;
    in response to the determination that the given term was replaced with the different term from the set of related terms, generating a modified search query that includes the different term; and
    providing the modified search query for presentation in a display of a user device corresponding to the current search session.

2. The method of claim 1, further comprising determining that a particular term in the current search query is a potentially inaccurate term.

3. The method of claim 2, wherein:
    determining that the particular term in the current search query is a potentially inaccurate term comprises determining that the particular term has been replaced with another term by other users in previous search sessions; and
    generating a modified search query comprises replacing the particular term with the different term.

4. The method of claim 2, wherein:
    determining that the particular term in the current search query is a potentially inaccurate term comprises determining that the particular term is included in a set of misspelled terms; and
    generating a modified search query comprises replacing the particular term with the different term.

5. The method of claim 4, further comprising:
    comparing the set of misspelled terms to the set of related terms; and
    determining, based on the comparing, that a matching term is included in each of the set of related terms and the set of misspelled terms, wherein:
        generating a modified search query comprises replacing the particular term with the matching term.

6. The method of claim 2, wherein determining that a particular term in the current search query is a potentially inaccurate term comprises:
    determining a subject context for the current search session based on subjects of queries submitted during the current search session; and
    determining that the particular term has less than a specified level of similarity to the subject context.

7. The method of claim 1, wherein identifying a set of related tokens comprises selecting, as the set of related tokens, tokens that have at least a specified level of similarity to the subject context of the current search session.

8. The method of claim 1, further comprising obtaining search results based on the modified search query.

9. A system comprising:
    one or more data stores storing a query log that includes search queries for a plurality of different search sessions; and
    data processing apparatus including one or more processors executing instructions that cause the one or more processors to interact with the data store and to perform actions including:
        receiving a current search query during a current search session;
        determining, based on a difference between terms of the current search query and terms of a previous search query received during the current search session, that the current search query is an attempt to refine the previous search query;
        identifying, based on the determination that the current search query is an attempt to refine the previous search query, a set of related terms based on a given term that is included in the previous search query, but not included in the current search query;
        determining, based on search log data for previous search sessions, that the given term was replaced with a different term from the set of related terms in at least a specified portion of the previous search sessions;
        in response to the determination that the given term was replaced with the different term from the set of related terms, generating a modified search query that includes the different term; and
        providing the modified search query for presentation in a display of a user device corresponding to the current search session.

10. The system of claim 9, wherein the instructions cause the one or more data processing apparatus to perform operations further comprising determining that a particular term in the current search query is a potentially inaccurate term.

11. The system of claim 10, wherein:
    determining that the particular term in the current search query is a potentially inaccurate term comprises determining that the particular term has been replaced with another term by other users in previous search sessions; and generating a modified search query comprises replacing the particular term with the different term.

12. The system of claim 10, wherein:

determining that the particular term in the current search query is a potentially inaccurate term comprises determining that the particular term is included in a set of misspelled terms; and generating a modified search query comprises replacing the particular term with the different term.

13. The system of claim 12, wherein the instructions cause the one or more data processing apparatus to perform operations further comprising:

comparing the set of misspelled terms to the set of related terms; and determining, based on the comparing, that a matching term is included in each of the set of related terms and the set of misspelled terms, wherein:

generating a modified search query comprises replacing the particular term with the matching term.

14. The system of claim 10, wherein determining that a particular term in the current search query is a potentially inaccurate term comprises:

determining a subject context for the current search session based on subjects of queries submitted during the current search session; and determining that the particular term has less than a specified level of similarity to the subject context.

15. The system of claim 9, wherein identifying a set of related tokens comprises selecting, as the set of related tokens, tokens that have at least a specified level of similarity to the subject context of the current search session.

16. The system of claim 9, wherein the instructions cause the one or more data processing apparatus to perform operations comprising obtaining search results based on the modified search query.

\* \* \* \* \*